United States Patent
King, Sr.

[11] Patent Number: 5,105,844
[45] Date of Patent: Apr. 21, 1992

[54] TWO STEP BRANCH FORMING ATTACHMENT

[76] Inventor: Lloyd H. King, Sr., 2909 S. Ocean Blvd. Apt. 6D, Highland Beach, Fla. 33487

[21] Appl. No.: 758,521

[22] Filed: Sep. 16, 1991

Related U.S. Application Data

[63] Continuation-in-part of Ser. No. 587,767, Sep. 24, 1990, abandoned.

[51] Int. Cl.⁵ .................. F16K 43/00; B23B 41/08; F16L 41/04
[52] U.S. Cl. ......................... 137/15; 137/318; 222/91; 285/197; 285/373; 408/67; 408/87; 408/137; 408/207
[58] Field of Search .................. 137/15, 315, 317, 318; 29/432, 798; 222/80, 81, 83.5, 91; 285/197, 373; 408/67, 87, 92, 137, 204, 207

[56] References Cited

U.S. PATENT DOCUMENTS

| | | |
|---|---|---|
| 1,181,131 | 5/1916 | Glauber . |
| 1,649,752 | 11/1927 | Stone .................. 285/373 |
| 1,928,316 | 9/1933 | Muto .................. 285/373 |
| 2,414,911 | 1/1947 | Temple .................. 137/318 |
| 2,839,075 | 6/1958 | Muellov .................. 137/318 |
| 3,129,920 | 4/1964 | Stillwagon .................. 251/148 |
| 3,162,211 | 12/1964 | Barusch .................. 137/318 |
| 3,195,932 | 7/1965 | Morton .................. 285/200 |
| 3,240,227 | 3/1966 | Burkholder .................. 137/318 |
| 3,258,822 | 7/1966 | Schlesch .................. 285/197 |
| 3,280,846 | 10/1966 | Anderson .................. 285/197 |
| 3,343,724 | 9/1967 | Malpas .................. 137/318 |
| 3,349,792 | 10/1967 | Larkin .................. 285/197 |
| 3,432,188 | 3/1969 | Turner .................. 285/197 |
| 3,460,715 | 8/1969 | Lane et al. .................. 137/318 |
| 3,460,721 | 8/1969 | Hamel et al. .................. 137/318 |
| 3,471,176 | 10/1969 | Gilchrist .................. 285/111 |
| 3,489,441 | 1/1970 | Malcom .................. 285/197 |
| 3,554,217 | 1/1971 | Ehrens et al. .................. 137/318 |
| 3,692,044 | 9/1972 | Wise .................. 137/318 |
| 3,756,261 | 9/1973 | Minchhoff .................. 137/318 |
| 3,891,150 | 6/1975 | Hoff .................. 239/272 |
| 3,995,655 | 12/1976 | Sands .................. 137/318 |
| 3,999,785 | 12/1976 | Blakely .................. 285/111 |
| 4,029,118 | 6/1977 | Merideth .................. 137/318 |
| 4,076,038 | 2/1978 | Wynne .................. 137/318 |
| 4,158,461 | 6/1979 | Francis .................. 285/111 |
| 4,239,265 | 12/1980 | King .................. 285/197 |
| 4,258,742 | 3/1981 | Louthan et al. .................. 137/318 |
| 4,373,235 | 2/1983 | Korgaonkar .................. 285/373 |
| 4,391,458 | 7/1983 | Blakeley .................. 285/112 |
| 4,730,636 | 3/1988 | Volgstadt et al. .................. 137/318 |
| 4,789,189 | 12/1988 | Robertson .................. 285/197 |
| 4,890,640 | 1/1990 | King .................. 137/512.4 |

FOREIGN PATENT DOCUMENTS 911835 7/1946 France .
631590 1/1962 Italy .

*Primary Examiner*—George L. Walton
*Attorney, Agent, or Firm*—Jacobson & Johnson

[57] ABSTRACT

A T-branch formation device using two identical side members to form a snap-on saddle around a resilient plastic pipe and a screw-in coupling cutter which cuts through resilient piping, retains the cut piece, and simultaneously provides a threaded surface for attaching a branch tubing which forms a leak-proof connection.

31 Claims, 7 Drawing Sheets

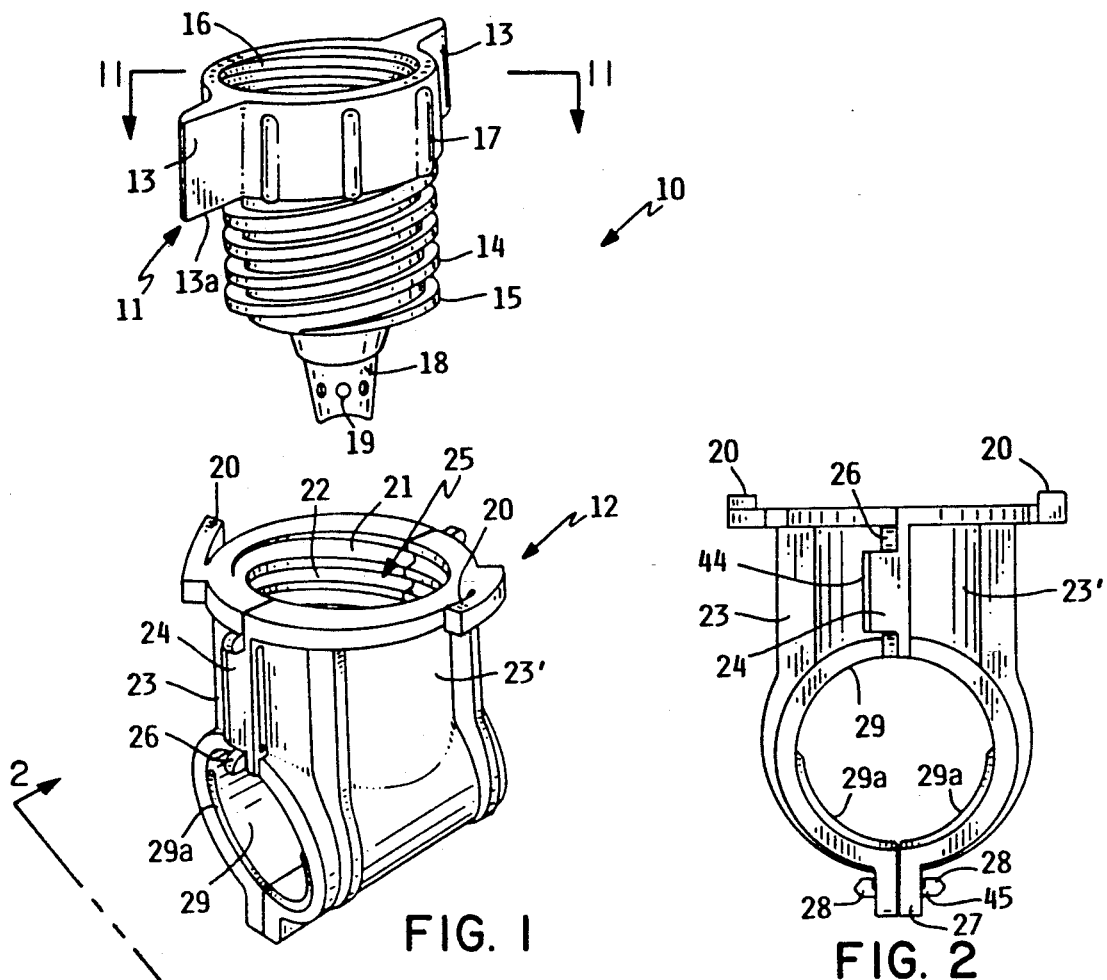
FIG. 1
FIG. 2
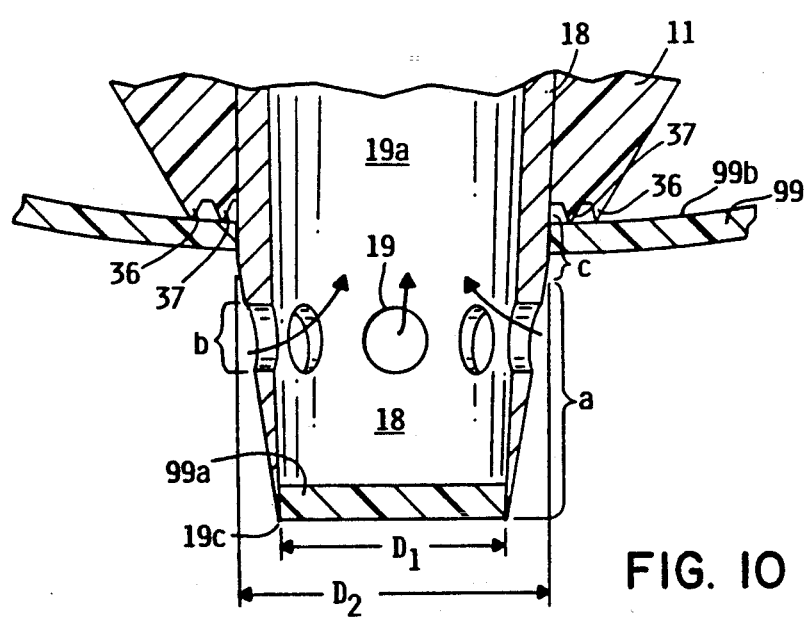
FIG. 10

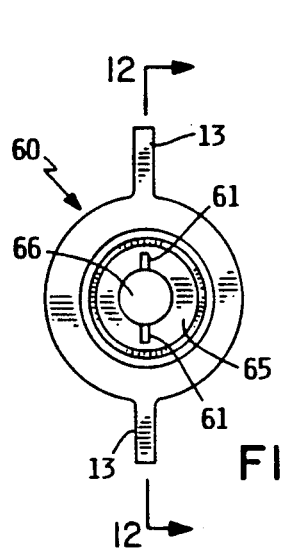
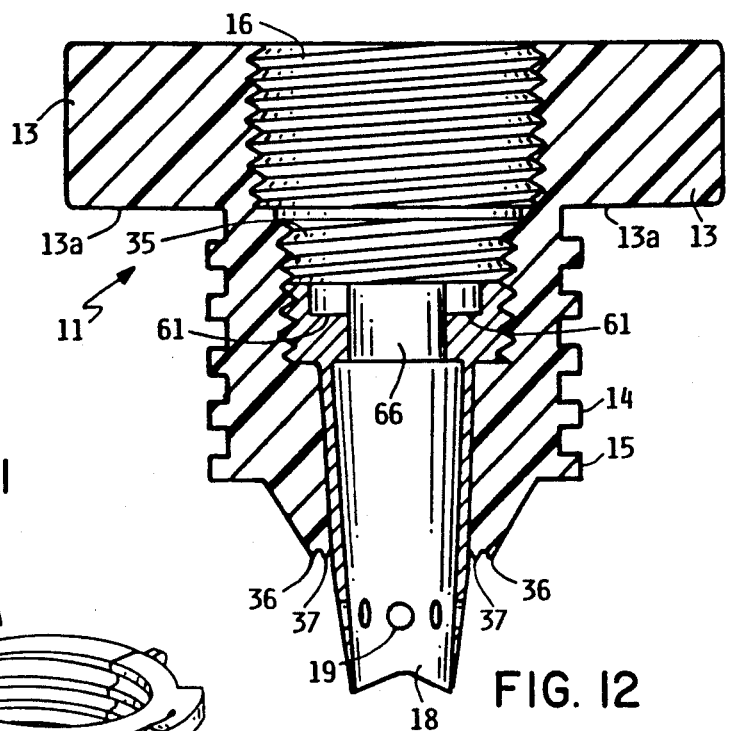
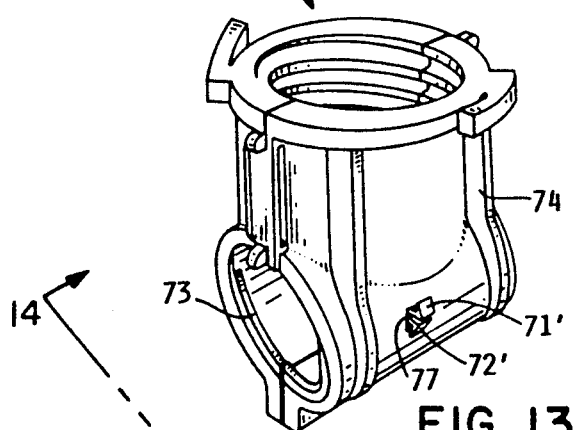
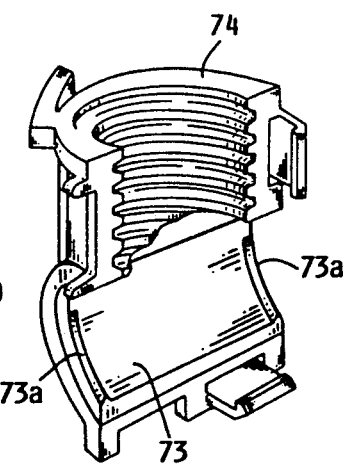
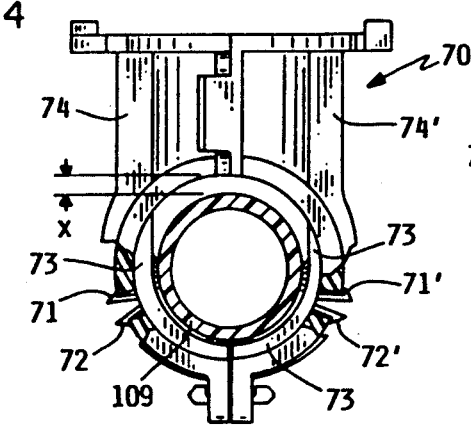

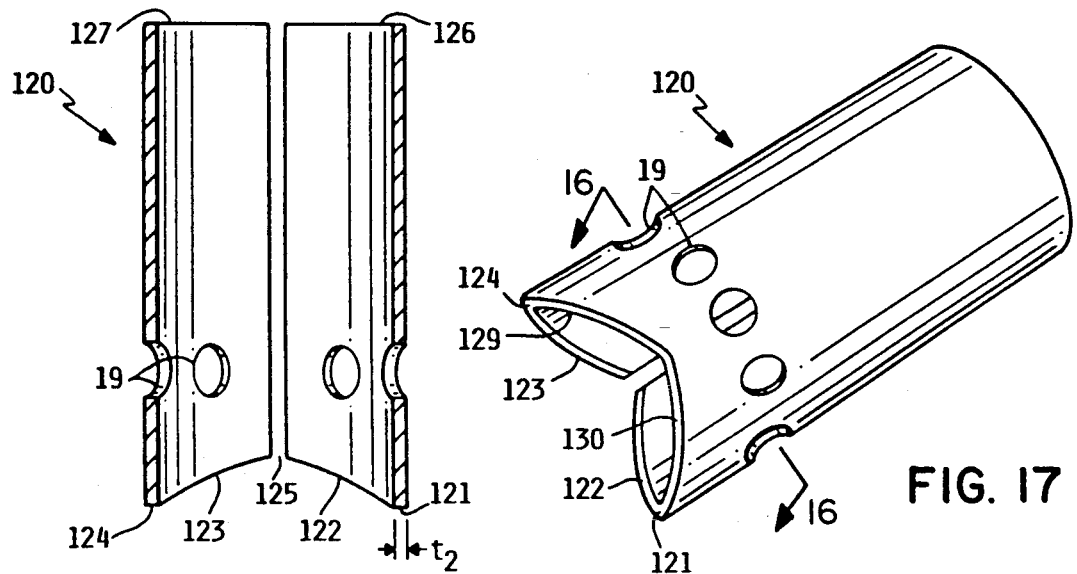
FIG. 16
FIG. 17
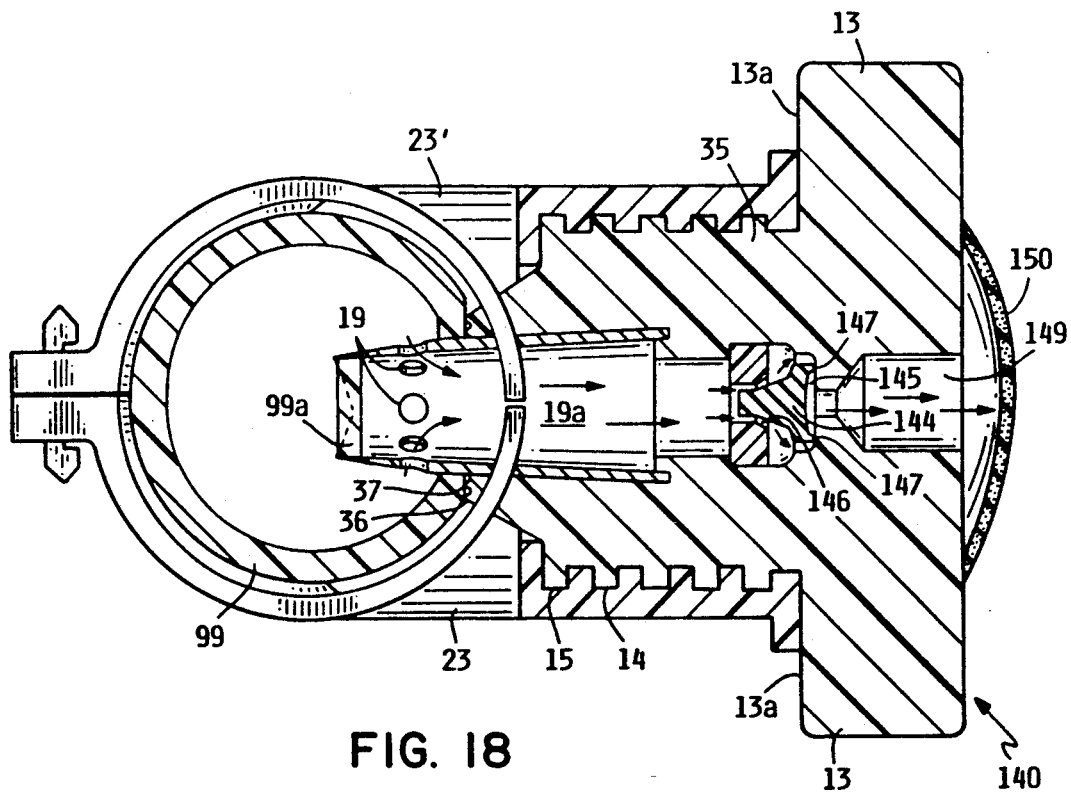
FIG. 18

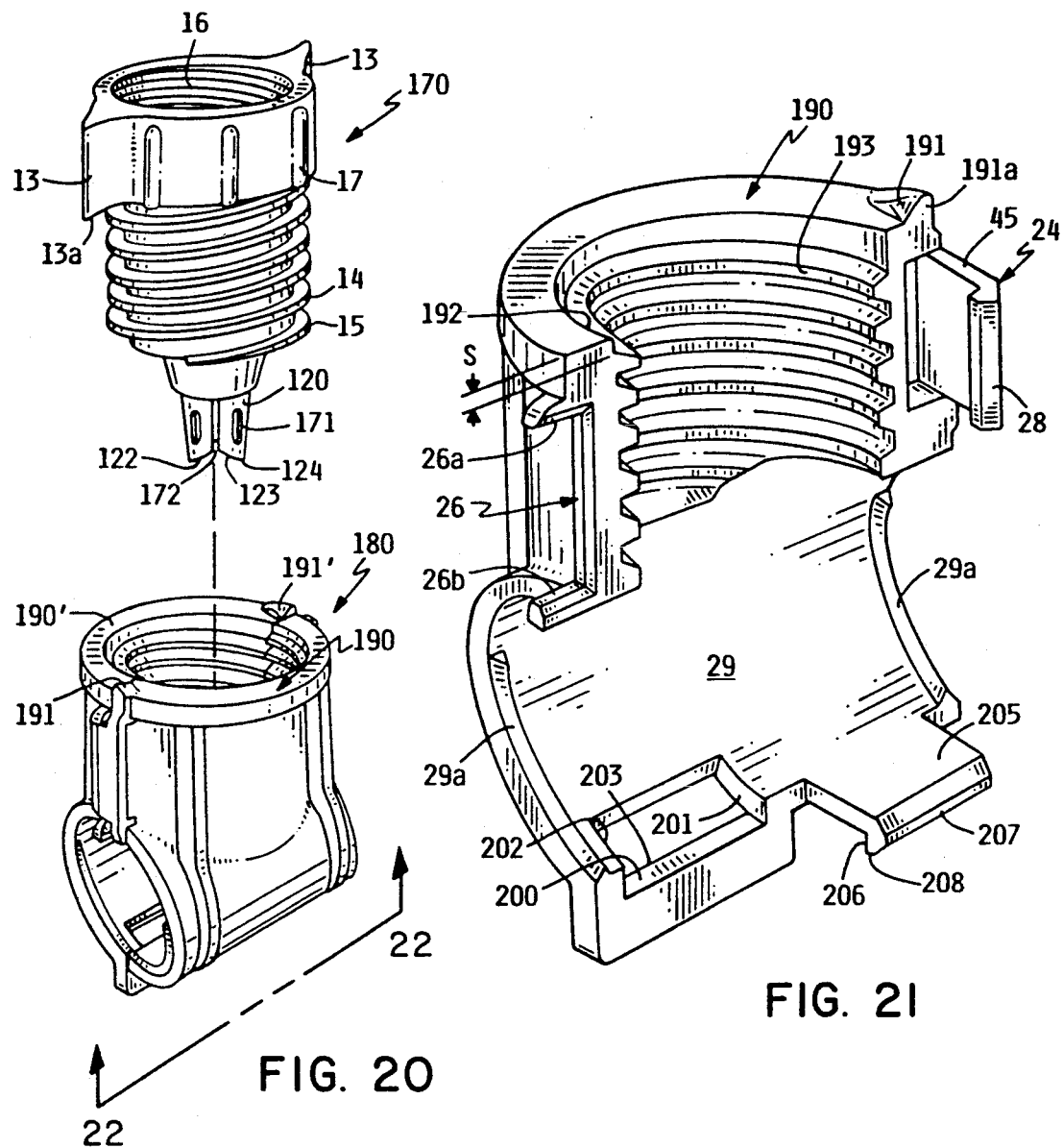
FIG. 21
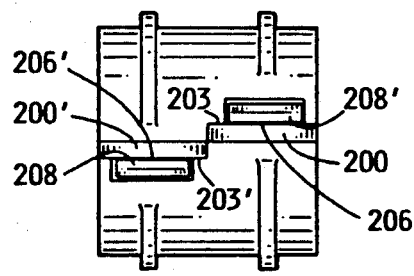
FIG. 20
FIG. 22

5,105,844

TWO STEP BRANCH FORMING ATTACHMENT

CROSS REFERENCE TO RELATED APPLICATIONS

This application is a continuation-in-part of my patent application Ser. No. 587,767 filed Sept. 24, 1990, now abandoned titled TWO STEP BRANCH FORMING ATTACHMENT.

FIELD OF THE INVENTION

This invention is in the field of pipe attachments, and more specifically, pipe attachments for systems requiring a user to form a non-corrodable branch connection to a main tubing without the user having to cut the main tubing.

BACKGROUND OF THE INVENTION

Pipe saddles are not a new invention. Generally, pipe saddles are fastened around a pipe so that one can connect a branch tubing to a main tubing. Attaching a branch tubing to a main tubing often requires numerous steps and sometimes causes difficulty in sealing the junction between the branch tubing and the main tubing. The present invention provides novel and useful improvements to pipe saddles, including a quick two-step branch coupling forming process whereby a user can snap two plastic non-corrodable self-mating members around a resilient pipe to form a pipe saddle clamp with a threaded recess for receiving a coupling cutter. Next by screwing a coupling cutter into the pipe saddle clamp the user not only cuts a circular hole in the resilient pipe but also stores the circular cut-out in the coupling cutter blade to prevent the cut-out from polluting the contents of the main tubing. The cutting of the main tubing with the coupling cutter also forms a leak-proof seal at the junction between the main tubing and the coupling cutter.

The two-step branch attachment is particularly well suited for underground irrigation systems that require in situ forming of branch lines to a main tubing, but it is also useful in other systems and locations that use resilient or flexible tubing. The two-step branch attachment of the present invention, unlike many of its predecessors, does not require flexible sealing rings between the clamp and the main tube. In addition, the present invention does not require glue or other adhesives to secure the clamp to itself or to the main tubing. Also many prior art pipe saddles require that the main tubing remains round in order to form a seal between the branch tubing and the main tubing. In the present invention the two-step branch attachment permits a user to form a leak-proof junction between a coupling and a partially flattened tubing as well as a round tubing.

The present invention contains two different sized female threads in the two-step branch attachment to permit the branch attachment to accommodate two different sizes of branch tubing.

DESCRIPTION OF THE PRIOR ART

U.S. Pat. No. 4,789,189 is a metal pipe saddle requiring a cutting tool to make a branch hole, and another device to reseal the hole;

U.S. Pat. No. 1,181,131 is a U-bolt pipe saddle with an extra piece required between the main and branch tubings to secure the fit;

U.S. Pat. No. 2,839,075 is a pipe saddle requiring more than two steps and several other pieces to create a branch tubing;

U.S. Pat. No. 3,129,920 is a combination valve and connector for two pipes, having little relevance in relationship to branch pipes;

U.S. Pat. No. 3,195,932 is a patent for valves for Dunnage mattresses having little relevance with respect to branch tubings;

U.S. Pat. No. 3,471,176 is a pipe saddle which does not specify a method for creating the hole for the branch tubing. Most likely, it employs a hand tool;

U.S. Pat. No. 4,239,265 is a pipe saddle requiring four steps and four different parts as well as a sealing ring;

U.S. Pat. No. 3,258,822 is a pipe saddle which requires a hand tool to cut open the main tubing to accommodate the branch tubing;

U.S. Pat. No. 3,280,846 is a pipe saddle requiring more than two steps for assembly, and a hand tool;

U.S. Pat. No. 3,432,188 is a pipe saddle which requires a cutting tool;

U.S. Pat. No. 3,489,441 is a pipe saddle which requires a cutting tool;

U.S. Pat. No. 3,891,150 is a pipe saddle not suited for high-pressure or high-wear situations;

U.S. Pat. No. 3,999,785 is a pipe saddle with no means for creating a hole in the main tubing;

U.S. Pat. No. 4,158,461 is a pipe saddle requiring a separate hand tool to create a hole in main tubing; and U.S. Pat. No. 4,391,458 concerns construction of a T-connection at the end of two pipes, not in the middle of one pipe.

U.S. Pat. No. 3,162,211 shows a device with a cutting needle for forming a hole in a pipe.

U.S. Pat. No. 4,076,038 shows a cutting tool with the end of the cutting tool having a larger diameter so that frictional contact between the pipe tapped is minimized.

U.S. Pat. No. 3,460,721 shows a valve with a rupture disk that can be penetrated by a tapered member.

U.S. Pat. No. 4,373,235 shows a circular pipe claim made from two identical semi-circular components.

U.S. Pat. No. 1,928,316 shows two separable semi-cylindrical section which can be clamped together on two pieces of pipe.

U.S. Pat. No. 4,730,636 shows a cutting surface having a flange that engages the plastic to prevent tearing stresses in the plastic.

U.S. Pat. No. 3,460,715 shows a tap with a needle point and a side port for tapping into the side of a sealed plastic bag.

U.S. Pat. No. 3,343,724 shows a similar tap a tap with a needle point and a side port for tapping into the side of a sealed plastic bag.

U.S. Pat. No. 1,928,316 shows a conduit coupling comprised of two semi-cylindrical members that fasten together by a hinge and bolt to form a circular conduit connector.

SUMMARY OF THE INVENTION

Briefly, the invention includes two identical self-mating plastic parts which a user snaps together around a main tubing to form a pipe saddle clamp around the main tubing with the pipe saddle clamp forming a threaded recess for receiving a coupling cutter, so that a user can screw a coupling cutter into the female threads in the pipe saddle clamp. The action of screwing the coupling cutter into the pipe saddle clamp simultaneously cuts a hole in the main tubing, forms a leakproof seal between the main tubing and the cutting blade on the coupling cutter and if desired permanently retains the cut-out in the coupling cutter.

BRIEF DESCRIPTION OF THE DRAWINGS

FIG. 1 is an exploded view of the two-step branch attachment including the pipe saddle clamp and the coupling cutter;

FIG. 2 is side view taken along lines 2—2 of FIG. 1;

FIG. 10 is a detailed view showing the coaction of the coupling cutter and the main tubing;

FIG. 11 is a top view of an alternate embodiment of a coupling cutter;

FIG. 12 is a sectional view taken along lines 12—12 of FIG. 11;

FIG. 13 is pictorial view of an alternate embodiment of the pipe saddle clamp with spacer inserts;

FIG. 14 is a side view taken along lines 14—14 of FIG. 13; and

FIG. 15 is a pictorial view of the inside of the alternate embodiment clamp with a spacer.

FIG. 16 is a sectional view an alternate embodiment of a cutting tool;

FIG. 17 is a pictorial view an alternate embodiment of cutting tool of FIG. 16;

FIG. 18 is a cross sectional view of a coupling cutter including an integral drain valve;

FIG. 20 is an exploded view of the preferred embodiment of the two-step branch attachment including the pipe saddle clamp and the coupling cutter;

FIG. 21 is an inside view of one of the two identical self-mating members of FIG. 20 used in forming the pipe saddle clamp; and FIG. 22 is a bottom view of the self-mating members of FIG. 21 fastened to its identical counter part.

DESCRIPTION OF THE PREFERRED EMBODIMENT

Figure 3:
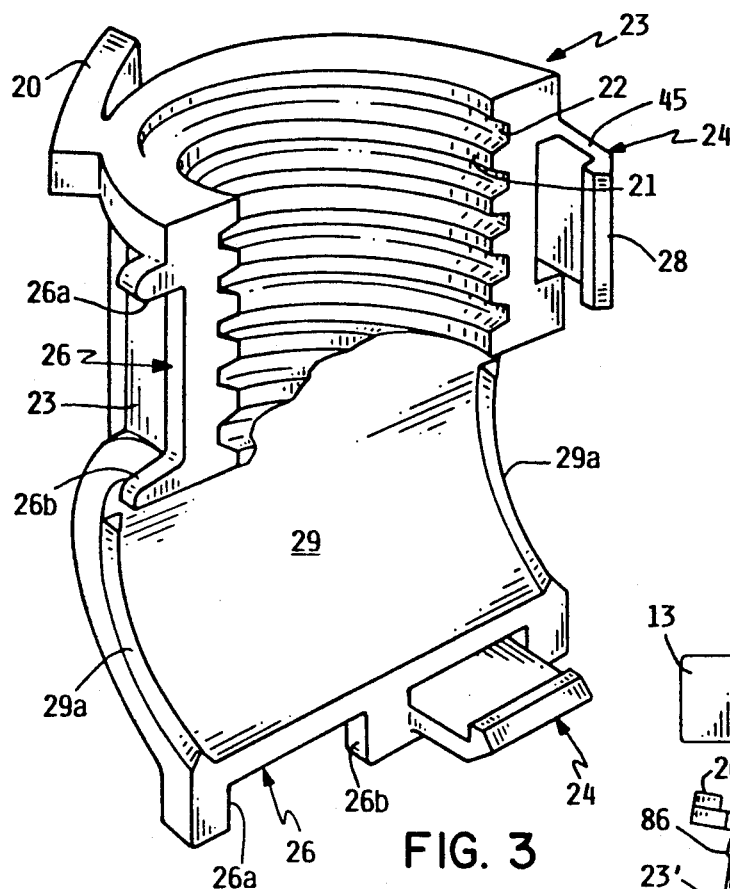
FIG. 3 is an inside view of one of the two identical self-mating members used in forming the pipe saddle clamp.

FIG. 1 is an exploded view of the three main parts of a two-step branch attachment 10. FIG. 2 shows a side view of two self-mating members 23, 23' of the two-step branch attachment which mount around the exterior of a main tubing. More specifically, the two-step branch attachment comprises two identical self-mating members 23, 23' which can be snapped together to form a pipe saddle clamp 12 which receives a coupling cutter 11 having a cylindrical self-sealing cutting tool 18.

Coupling cutter 11 has two oppositely facing wing grips 13 and a ribbed surface 17 located on its periphery to aid a user in twisting it into the pipe saddle clamp formed by self-mating members 23, 23'. Coupling cutter 11 has two sets of external threads 14, 15 (Double pitch) to eliminate the need for a left- or right-hand mating member. Coupling cutter 11 also has female threads 16 for connecting a branch pipe thereto. Although FIG. 1 shows only the upper inner female threads 16, coupling cutter 11 also has a lower, smaller diameter female thread 35 (shown in FIG. 7, 8 and 9) which allows use of coupling cutter 11 with two different sized branch tubings. Upper female threads 16 or lower female threads 35 enable a user to quickly screw a branch tubing into coupling cutter 11 to form a branch connection to the main tubing.

Numeral 18 points to the cylindrical cutting tool with a cylindrical tapered cutting blade located on one end for use in cutting a hole in a resilient main tubing, such as a polyethylene tubing. Cutting tool 18 contains several radially spaced holes 19 which allow later use of the cylindrical cutting tool 18 as a fluid tap and holes 19 as fluid ports.

FIG. 10 shows cutting tool or blade 18 in greater detail. Cutting tool 18 includes a frustoconical tapered region a, a radial port region b, and a sealing region c. The end of cutting tool 18 includes a cutting edge 19c having a diameter $D_1$ which is the same as the inside diameter of the cutting tool. The outside diameter of cutting tool 18 is designated by dimension $D_2$ with dimension $D_2$ being larger than dimension $D_1$. Holes 19 form inlet ports for the branch tubing by allowing fluid in the main tubing to enter fluid passage 19a through holes 19. In general I maintain the area of holes 19 such that the total open area in holes 19 is larger than the cross sectional area of cutting tool 18.

FIG. 10 shows coupling cutter 11 for forming a hole in the main tubing and for sealing the junction between main tubing 99 and coupling cutter 11 to prevent leakage of fluid. Coupling cutter 11 has a through passageway 19a therein with an open end cutting edge or portion 19c at one end of passageway 19. Coupling cutter 11 includes sealing surfaces identified by reference numeral "c" and reference numerals 36 and 37 which are disposed on an outer surface of coupling cutter 11. FIG. 10 also shows all the multiple sealing surfaces engaging a portion of main tubing 99 after coupon 99a has been retained in end of cutting tool 18. If coupon 99a remains in end of coupling cutter 11 side openings 19 can be used as radial fluid ports. On the other hand if coupon 99a is removed form the end of cutting tool 18 the opening formed inside the open end of cutting tool 18 on coupling cutter 11 formerly occupied by coupon 99a can be used as an axial fluid port. Consequently, cutting tool 18 has both radial an axial fluid ports proximate the open end of cutting tool 18. Coupling cutter 11 is rotatable threaded for cutting out a coupon 99a in main tubing 99 to form a hole in main tubing 99 and retaining coupon 99a within and blocking open end of coupling cutter 11 so that side openings 19 can be used as fluid ports. In this mode coupling cutter 11 permits fluid flow through at least one flow opening, such as fluid port 19, and through passageway 19a. If coupon 99a remains within end of coupling cutter 11 side fluid ports 19 fluidly connect a branch tubing to main tubing 99. On the other hand if coupon 99a is removed form end of cutting tool 18 the open end of cutting tool 18 can also form a fluid port to fluidly connect a branch tubing to main tubing 99. If desired the side openings could be eliminated and the opening formed inside the end of cutting tool 18 could be used as the sole fluid port for directing fluid from the main tubing to a branch tubing. In such an embodiment the coupon would have to be removed from the cutting tool to permit use of the opening formed by the open end cutting tool 18 to form the axial fluid port.

In the embodiment of FIG. 1, two identical self-mating members 23, 23' snap together to form pipe saddle clamp 12. Use of identical self-mating members reduces production costs since only one mold is necessary to make both mating members; but more importantly it also eliminates the user having to search for mating coupling members when a user is installing a pipe saddle clamp since a user always has a self-mating pair if the user has at least two self-mating members.

Since mating members 23 and 23' are identical, only one will be described. Mating member 23 contains two resilient male latch members and two female latch members spaced from one another with one male latch member and one female latch member on opposite side of the mating member that snaps around the main tubing.

FIG. 3 shows the location of the male and female latch members. Located on the top left side of mating member 23 is a female latch member 26 having side walls 26a and 26b for holding a male latch member in position. Similarly, located on the left bottom side of mating member 26 is an identical female latch member 26 having side walls 26a and 26b for holding a male latch member in position. Located on the top right side of self-mating member is a male latch member 24 having a resilient tongue 45 and a wedge shaped head 28. Located on the lower right side of self-mating member 23 is an identical male latch member 24 having a resilient tongue 45 and a wedge shaped head 28. Note that the placement of the male and female latch members permits self-mating members 23 and 23' to provide both alignment and locking engagement of the self-mating members 23 and 23' to each other.

As FIG. 3 shows, mating member 23 has an inner curved surface 29 having the same general radius of curvature as the main tubing around which mating member 23 fastens and clamps. Located on opposite ends of inner curved surface 29 are arcuate ridge members 29a which extend approximately halfway around curved surface 29. The purpose of arcuate members 29a is to provide ribs for biting into and engaging the main tubing which prevents longitudinal sliding of the main tubing as well as forcing the main tubing toward the threaded recess in the top of the mating member 23.

FIG. 20 is an exploded view of the three main parts of the preferred embodiment of a two-step branch attachment 170. FIG. 20 is virtually identical to FIG. 1 and shows a side view of two self-mating members 190, 190' of the two-step branch attachment which mount around the exterior of a main tubing. More specifically, the two-step branch attachment comprises two identical self-mating members 190, 190' which can be snapped together to form a pipe saddle clamp 180 which receives a coupling cutter having a cylindrical self-sealing cutting tool 120. Cutting tool 120 includes elongated slots for use as ports and high regions 124 and low regions 123. The seam along cutting tool 120 is identified by reference numeral 172. The assembled coupon cutter comprises member 190 and 190' with member 190 having a ramp 191 with a a face 191a (FIG. 21) to prevent the coupling cutter from working loose. Like reference numerals indicate identical parts in the various views.

FIG. 21 illustrates the preferred embodiment of the connector and differs from the embodiment of FIG. 3 in two main respects. In the embodiment of FIG. 21 the double pitch thread 193 are started approximately a half turn from the top of connector 190. The distance that the thread starts from the top is indicated by "S" in FIG. 21 and comprises about a ½ thread distance. The purpose of recessing the starting thread a half turn is to provide for easier starting of coupling cutter 170 in pipe saddle clamp 180. That is, the sides of pipe saddle clamp 180 act as a cylindrical guide to assist the user in aligning the threads 15 of coupling cutter 170 in the threads 193 in pipe saddle clamp 180.

A further feature of the embodiment of the invention is the reversal of the latch members in the lower portion of member 190 to provide a clamp saddle that becomes tighter if the line pressure should expand the line connected to the pipe saddle clamp. The mating member 190 includes a lip 200 having a face 203 for engaging a male latch member. Located on one side of lip 200 is a first edge 202 and on the opposite side is a second edge 201. Also located on the lower portion of member 190 is a downward facing male latch member 205 that has an end 207 and a lip 206 for engaging a face on another self mating member.

FIG. 22 shows a bottom view of the assembled coupling cutter with male latch member 208 in engagement with face 206' of lip 200' and male latch member 208' in engagement with face 206 of lip 200. With the embodiment of FIG. 20 to 22 it is evident that more resilient latch members 205 may be used since any outward radial pressure due to expansion of the pipe located in the pipe saddle clamp forces the male latch members into tighter engagement with each other since the male latch members will be exerting a radial outward force against lip 200.

One of the features of the invention is that identical mating members 23 snap together to form a self-locking saddle clamp around a main tubing with only finger and hand pressure of the user. That is, when a user snaps identical self-mating members 23 and 23' together, each of the resilient male latch members 24 on each self-mating member engage female latch members 26 on the opposite self-mating member to hold self-mating members as a unit.

Figure 5:
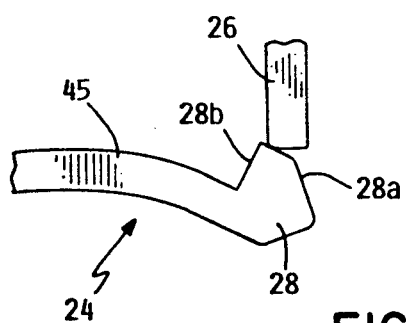
FIG. 5 is a side view of a male latch flexing to engage a female latch so two self-mating members can be clamped together.
Figure 6:
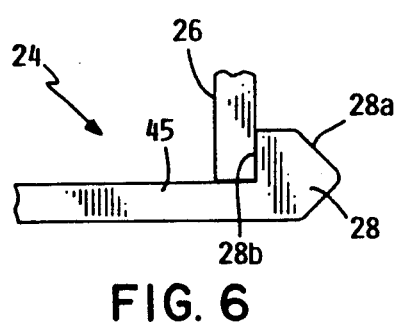
FIG. 6 is a side view of the male latch and female latch of FIG. 5 snapped in place to securely hold two self-mating members in alignment and together.

To illustrate the latching process, refer to FIGS. 3, 5 and 6. FIGS. 3 and 5 show a male latch member 24 having a resilient neck 45 with a wedge-shaped head 28, a deflecting surface 28a and a latching lip 28b. To understand the latching process, refer to FIG. 5 which shows male latch member 24 with resilient neck 45 bending outward as the user forces head 28 past female latch member 26. Note that deflecting surface 28a forces resilient neck 45 and head 28 outward around latch member 26. FIG. 6 illustrates the result of head 28 of male latch member 24 moving past female latch member 26; namely, resilient neck 45 of male latch member 24 snaps back around female latch member 26 and prevents its disengagement. In general, the male latch members are sufficiently resilient so they flex and bend in response to a user squeezing mating tubing attachments 23 and 23' together yet sufficiently stiff so that once assembled, the latch members 24 and 26 interlock, thereby preventing disengagement.

Not only do the latching members hold the two self-mating members 23 and 23' together, they also align the two mating members with one another since the sidewalls 26a and 26b on the female latch members act as lateral stops to the sides of the male latch member 24 which prevents lateral displacement of male latch members 24 when they are in engagement and locked in the female latch member.

Figure 4:
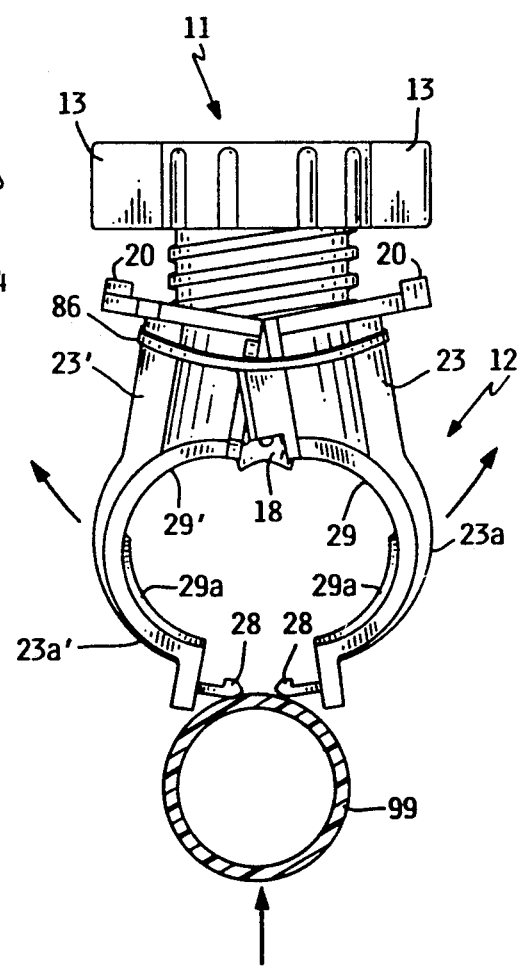
FIG. 4 is a side view of a disassembled pipe saddle clamp being fitted around a pipe.

FIG. 4 depicts the process of a user mounting self-mating members together around a resilient tubing 99. A rubber band 86 loosely hold the two unassembled self-mating members 23 and 23' in a pivotable relationship about coupling cutter 11. Note that the installation process is simplified because a rubber band 86 holds all three components in a preassembled condition with self-mating members 23 and 23' in a pivoting relationship to one another to allow a user to separate the self-mating members and place them outside of tubing 99. That is, by separating the bottom portion of self-mating members 23 and 23', (band 86 holds the top portion of self-mating members proximate one another) a user can slip the lower portion of self-mating members 23 and 23' around a main tubing 99.

FIG. 4 also shows self-mating members 23 and 23' around a main tubing 99 with coupling cutter 11 retracted between self-mating members 23 and 23'. Once the self-mating members 23 and 23' are positioned around main tubing 99, the inner curved surfaces 29 and arcuate members 29a are in position to engage the main tubing. To complete the latching assembly of the self-mating members 23a and 23', the user applies radial inward pressure to the outside of self-mating members 23a and 23' which forces self-mating members 23a and 23' to latch together into a pipe saddle clamp that fits loosely around the main tubing.

Latching self-mating members 23 and 23' to one another forms a threaded recess 25 for receiving coupling cutter 11. The threaded recess 25 inside pipe saddle clamp 12 has double-pitch threads comprising two sets of threads 21 and 22 to enable a user to screw the double-pitch external male threads 14 and 15 on coupling cutter 11 into female threads 21 and 22.

To prevent accident loosening of coupling cutter 11 in self-mating members 23 and 23', each mating member includes a resilient, one-way latch stop 20 to prevent loosening of coupling cutter 11 after a user screws coupling cutter 11 into the pipe saddle clamp formed by self-mating members 23 and 23'. That is, as a user rotates wing member 13 toward stop 20 the last turn, the user can only turn wing grip 13 in one direction since the resilient flexible stops 20 flex downward and slide under wing members 13 as the user screws coupling cutter 11 inward. However, turning wing members 13 in the opposite direction causes wing members to engage the end of resilient stop 20 and prevent wing members from turning in the opposite direction. Consequently when a user attempts to unscrew coupling cutter 11 from pipe saddle clamp 12, wing grips 13 catch on teeth 20 making withdrawal of cutting cutter very difficult. Because coupling cutter 11 cannot easily move backward, the coupling cutter 11 becomes securely locked in pipe saddle clamp 12.

Figure 7:
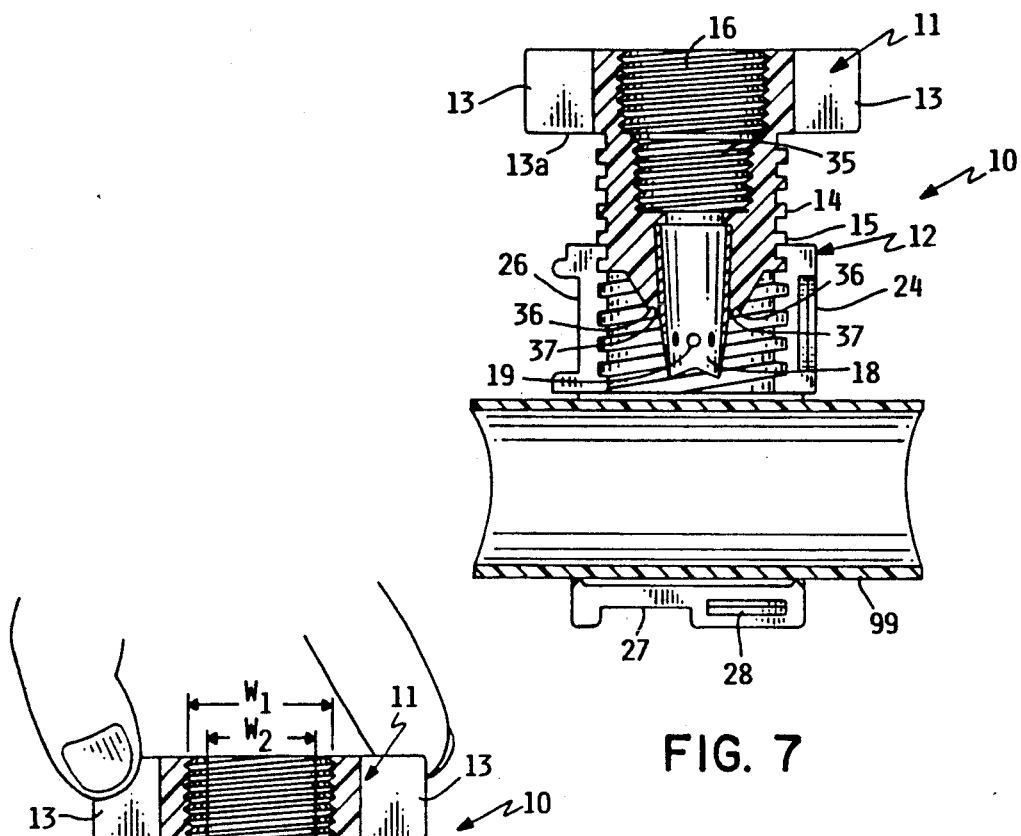
FIG. 7 is a sectional view of the two-step branch attachment secured around a main tubing.
Figure 8:
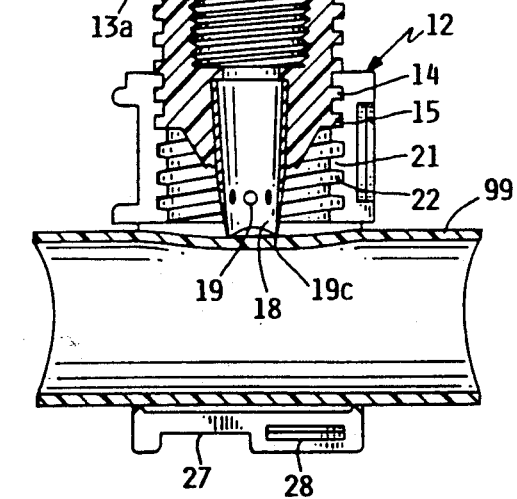
FIG. 8 is a sectional view of the coupling cutter being twisted into a main tubing.
Figure 9:
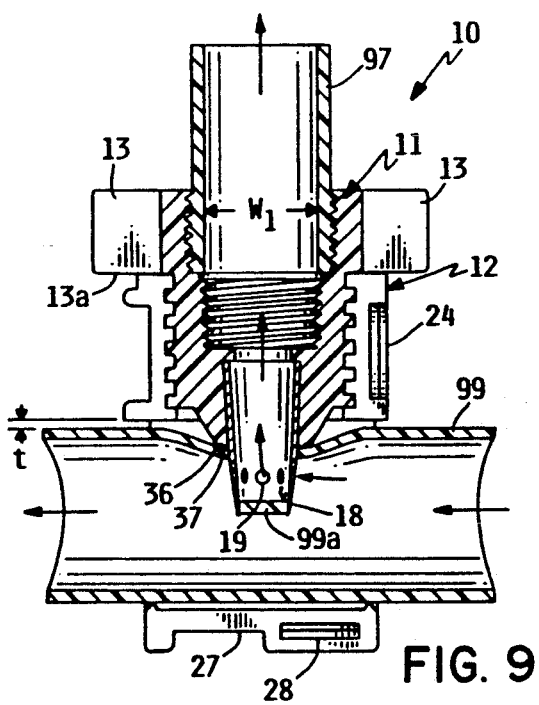
FIG. 9 is a sectional view of the two-step branch attachment functioning as a branch tubing to the main tubing.

FIG. 2 is a side view of pipe saddle clamp 12 without a main tubing in pipe saddle clamp and FIGS. 7, 8 and 9 show coupling cutter 11 simultaneously cutting a hole and forming a seal with a resilient plastic tubing. FIG. 2 shows the side- and bottom-locking latch mechanisms holding the self-mating members 23 and 23' in position for receiving a coupling cutter. The side- and bottom-locking mechanisms work identically. They have the same three parts, head 28, resilient neck 45 female latch 26.

FIGS. 7, 8 and 9 illustrate the simultaneous cutting of a hole in the main tubing and consequent sealing between the main tubing and the coupling cutter 11 in a single step. FIG. 7 is a sectional view of the two-step branch attachment 10 with pipe saddle clamp 12 located around main tubing 99. Note the different sized female threads 16, 35 in the coupling cutter designated as $w_1$ and $w_2$. Since pipe saddle clamp 12 securely locks onto main tubing 99, the next step in completing the branch connection is merely screwing coupling cutter 11 into clamp 12. Of particular interest, note a flat inner sealing ridge 37 and an outer flat sealing ridge 36 located around cylindrical cutting blade 18 on coupling cutter 11. In the present embodiment, flat circular sealing ridges 36, 37 can provide either a primary, a secondary or a backup sealing system to prevent leakage of liquid transferred from main tubing 99 to coupling cutter 11.

FIG. 7 shows coupling cutter 11 in the position ready for a user to screw coupling cutter 11 into clamp 12 by grasping and rotating wing grips 13. FIG. 8 shows a user turning coupling cutter 11 into clamp 12 by grasping and rotating wing grips 13. As the user rotates coupling cutter 11, self-sealing cutting tool 18 flattens main tubing 99 as the cutting edge 19c on cutting tool 18 begins to cut through main tubing 99. As the user rotates coupling cutter 11, cutting tool 18 cuts a circular hole in tubing 99.

FIG. 9 shows two-step branch attachment 10 after full insertion of coupling cutter 11 into clamp 12 and after cutting tool 18 cuts through main tubing 99. FIG. 10 shows a detailed view of cutting tool 18 engaging main tubing 99. Note small circular cut-out section or coupon 99a of main tubing 99 removed by cutting tool 18 is frictionally held in the circular opening in the tip of cutting tool 18. Since the cutting action actually wedges section 99a tightly into the end of the cutting tool 18 a user can leave section 99a in tubing 99. That is, it is unnecessary for a user to remove coupling cutter 11, take out section 99a and replace coupling cutter 11 once the hole is cut in the main tubing. Consequently, with the two steps of snapping self-mating members 23, 23' around a main tubing and then screwing a coupling cutter 11 into the self-mating members 23, 23' the user has in two steps formed a branch attachment to a main tubing. Also as cutting tool 18 cuts a hole in main tubing 99, it simultaneously forms a leakproof seal between main tubing 99 and the sealing region b on cutting blade 18 on the coupling cutter 11.

Also once a user screws coupling cutter 11 in place, flat circular sealing ridges 36 and 37 coact with the partially flattened tubing 99 to form a series of backup or secondary sealing regions which further prevent fluid from leaking from the junction between the main tubing and the branch tubing.

The invention has been described with attachment of a branch tubing to a flexible plastic tubing used in underground water systems. Typically, such flexible and resilient tubings are made from polyethylene or the like. However, it is envisioned my invention is suitable for other pipe materials.

In operation of the invention as a branch coupling a portion of the liquid flows along main tubing 99, through fluid inlets 19, up through cutting tool 18 and into a branch tubing 97 connected to coupling cutter 11 (FIG. 9).

A feature of the present invention, as illustrated in FIG. 9, is that the even though the cutting process deforms or slightly flattens resilient tubing 99, the inherent resiliency of tubing 99 functions to help maintain leakproof engagement between the main tubing 99 and coupling cutter 11.

To illustrate the leakproof engagement, refer to FIG. 10 which shows cylindrical hole cutting blade 18 in an enlarged sectional view in leakproof engagement with tubing 99. Cutting tool 18 contains three regions, a first tapered region "a", a cylindrical port region "b" and a cylindrical sealing region "c" for forming a fluid tight engagement with the opening cut resilient tubing 99. Since cutting tool 18, tapers inward the diameter of the hole cut in tubing 99 is smaller than the outside diameter $D_2$ of cutting tool 18. Note the inside cutting blade 18 contains a cutting edge 19c with a smaller diameter $D_1$ and a sealing region with a larger outside diameter $D_2$. The difference in the diameter of the hole in resilient tubing 99 and the outside diameter of cutting tool 18 in sealing region c insures that tubing 99 forms an interference fit thereby form a leakproof seal between tubing 99 in sealing region c of cutting blade 18. In the event that the sealing region c does not form a complete seal, I also provide secondary or backup flat circular sealing ridges 36 and 37 that tightly engage flattened surface 99b of resilient tubing 99. Note the sealing ridges 36 and 37 do not conform to the circular surface of tubing 99 but are flat, so that, as resilient tubing 99 is forceed radially outward by the pressure in tubing 99, the resilient surface 99b is forced into tighter sealing engagement with flat sealing ridges 36 and 37. Thus, the present invention permits a user to form a sealing region between the main tubing and the coupling cutter by partially deforming the resilient main tubing.

FIGS. 11-15 are drawings of alternate embodiments of the invention. FIG. 11 is a top view of a coupling cutter 60 which has an insert 65. Coupling cutter 60 is almost identical to coupling cutter 11, except the internal cutting tool 18 is separate from coupling cutter 11. A user can insert coupling cutter 60 in coupling cutter 11 by a hand tool such as a screw driver. The head of insert 65 screws in threads 35 while the blade of a screwdriver fits in blade slots 61. The advantage of coupling cutter of FIG. 12 is that the cutting blade can be made in separate parts and inserted into the main portion of coupling member. This permits a user to select the proper size openings in the blade for the branch tubing. For example, a user may want smaller or larger ports 19 in cutting blade 18.

FIGS. 13 to FIG. 15 show an alternate embodiment of pipe saddle clamp 70 that uses semi-cylindrical inserts 73 and 73' to adapt my pipe saddle clamp for engagement with a smaller size tubing. Clamp 70 is made of two identical self members 74, 74' and are identical to selfmating member 23 and 23 except, each self members 74, 74' has a small hole 77 in the side to permit upper and lower flexible one way clasps 71, 72 to couple insert 73 thereto. Two identical cylindrical inserts or fillers 73 and 73' are used to reduce the internal diameter of the saddle to permit use of the pipe saddle clamp with a smaller size main tubing. Fillers 73, 73' each have an upper and lower clasp 71, 72 which keep fillers 73, 73 in place inside side self-mating members 74, 74. Also note the top portions 73a each smoothly taper upward so that the resilient pipe 109 can be forced toward the top portion of the opening in my saddle clamp 70. FIG. 14 shows a clearance x between tubing 109 and the interior of pipe saddle clamp 70 to illustrate that my invention fastens branch pipes to main tubings even though the opening in the pipe saddle clamp is larger than the diameter of the primary pipe.

FIG. 13 is a side view of alternate clamp 70. Note that fillers 73 are snugly coupled into side members 74, 74, and held securely in place by upper and lower clasps 71, 72.

FIG. 14 is a pictorial view showing filler 73 snugly in place inside side member 74 with arcuate pipe engaging members 73a located on opposite ends of insert 73.

FIG. 16 shows a cross sectional view of a cylindrical cutting tool 120 formed from a flat piece of metal and FIG. 17 shows a perspective view of cutting tool 120. Cutting tool 120 is similar to cutting tool 18 in that cutting tool 120 cuts a hole into the tubing and holds the cut piece in the end of cutting tool 120 in the same manner as cutting tool 18. Cutting tool 18 is formed from a seamless tubing and contains an annular sealing region around the outer cylindrical surface of the cutting tool. In contrast cutting tool 120 is rolled from a flat piece of metal and has a seam 125 where end 127 and end 126 abut against one another thus making it difficult to use the outside surface of the cutting tool 120 as a sealing region. Consequently, with cutting tool 120 the sealing ridges 36 and 37 become the primary seals as they engage the flattened outer surface of the main tubing. Thus an advantage of my invention is that either a seamless or a seamed cutting tool can be used in my coupling cutter.

The cutting tool 120 also differs from cutting tool 18 in that the shape of the blade is different. Instead of having a tapered cylindrical blade, cutting tool 120 has a first lower tooth 121, a recessed area 123, a recessed area 122 a second lower tooth 124, a recessed area 129 and a recessed area 130 that function like a saw to cut a hole in a pipe as blade 120 is rotated against a tubing. Cutting tool 120 mounts in coupling cutter 11 in the identical manner that cutting blade 18 mounts in coupling cutter 11. FIG. 16 shows that cutting tool 120 has a uniform blade width designated by $t_2$.

FIG. 18 shows an alternate embodiment of my cutting tool that incorporates a drain valve directly into coupling cutter 140 with coupling cutter 140 mounted directly on main pipe 99 to provide drainage to main line 99 of a fluid system. The advantage of the embodiment of FIG. 18 is that it provides the user means for quickly attaching a drain valve to an underground watering system or the like without any special tools. In addition also permits a user to attach a drain valve to a main tubing with two quick steps.

The type of drain valve useable in my coupling cutter 140 is shown in greater detail in my U.S. Pat. No. 4,890,640. Coupling cutter 140 includes a resilient stopper plug 144 that is axially displaceable in coupling cutter 140 in response to the fluid pressure in the main line 99. In operation of the coupling cutter with a drain valve the stopper plug 144 moves and seats against annular seat 145 as the fluid pressure in main line 99 increases thereby preventing fluid from escaping past stopper plug 144. As the fluid pressure in main line 99 decreases stopper plug 144 contains resilient members 147 that axially force plug 144 away from and into a non sealing relation with seat 145. With stopper plug 144 located in a nonsealing relationship on annular seat 145 fluid can drain out of main pipe 99 through passage 19a, passage 149 and dispersal pad 150. If coupling cutter 140 with a drain valve is used in an underground water system the water is dispersed to the surrounding subsoil by a dispersal pad 150. One of the advantages of stopper plug 144 is that if the ground water level in the surrounding subsoil should become high enough to flow back into the main pipe 99 stopper plug 144 seats against conical seat 146 to prevent backflow into main pipe 99. The like portions in coupling cutter 11 and coupling cutter 140 are identified with identical reference numerals.

While coupling cutter 140 is shown with an integral drain valve, my couping cutter 140 may also be used with other special attachments used in the irrigation field or the like to eliminate the need to hook up additional attachments to the coupling cutter after the opening has been formed in main tubing 99. FIG. 18 illustrates that coupling cutter 140 can be mounted laterally on main pipe 99 to permit side attachment of a coupling cutter with integral drain valve to an underground water line. This feature is helpful in existing systems where it may be difficult to attach a drain valve to the underside of a main pipe.

Figure 19:
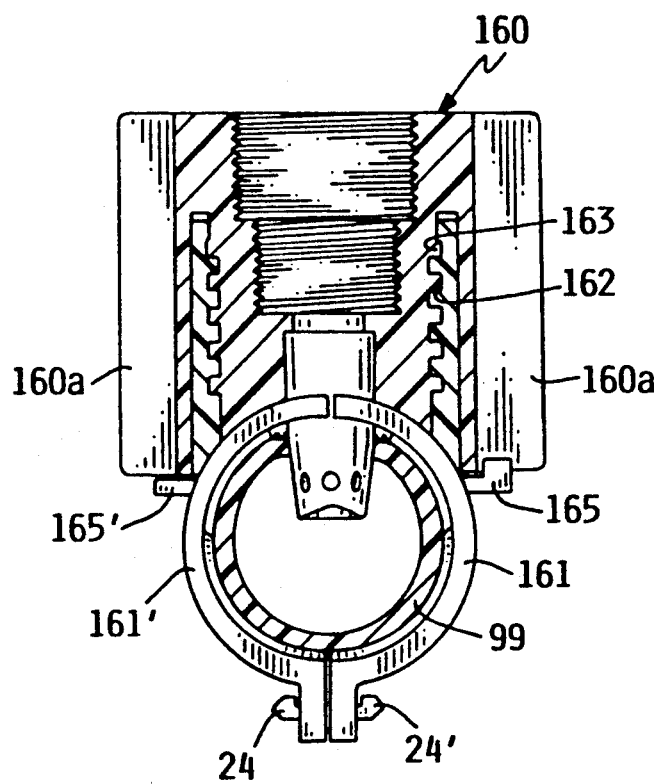
FIG. 19 is a cross sectional view of an alternate embodiment of a coupling cutter having a female housing for engaging self mating members.

FIG. 19 shows an alternate embodiment of my self mating members that is similar to self mating members 23 and 23' except the coupling cutter 160 includes a double pitch female thread 162 and the two self mating members 161 and 161' include an exterior double pitch male thread 163. With the embodiment of FIG. 19 the top half of the saddle clamp formed by the two self mating members is held together not by latch members but by the cylindrical housing in coupling cutter 160. The other components of the coupling cutter 150 remain the same.

Instead of using one way stops on the top of saddle formed by members 161 and 161' the one way stops 165 and 165' are located on the lower portion of the two self mating members 161 and 161'. The bottom portion of self mating members 161 and 161' are held together by the identical latching members shown in FIG. 3. With the embodiment of FIG. 19 the wing members 160a extend downward into engagement with the stops 165 and 165' in the identical manner that wing members 13a engage stops 20 on pipe saddle 12. The advantage of the invention of FIG. 19 is that coupling cutter 160 can prevent separation of pipe saddle formed by members 161 and 161' by encapsulating the top portion of the two self mating members with a singular cylindrical confinement housing as opposed to the combination of latch members and a coupling cutter insert shown in FIG. 1.

I claim:

1. A branch connector for forming a branch line to a main tubing comprising;
    a first mating member, said first mating member having a top portion for coupling to a branch tubing and a bottom portion for engaging a main tubing, said top portion having a first threaded portion for receiving a coupling, said bottom portion having a region which fastens around the main tubing;
    a second mating member, said second mating member having a top portion for coupling to a branch tubing and a bottom portion for engaging the main tubing, said top portion of said second mating member having a second threaded portion for receiving a coupling, said top portion of said second mating member having first latching means for latching said top portion of said first mating member to said top portion of said second mating member, said bottom portion of said second mating member having second latching means for latching said bottom portion of said first mating member to said bottom portion of said second mating member to permit a user to form a threaded opening to receive a coupling cutter by snapping said first mating member to said second mating member, said first latching means and said second latching means having identical parts for snapping together to thereby form a pipe saddle clamp around the main tubing; and
    a coupling cutter having a through passageway therein with an open end cutting portion at one end of said passageway, a sealing surface being disposed on an outer surface of said coupling cutter and at least one flow opening being positioned proximate said open end cutting portion, said coupling cutter rotatable threaded for cutting out a coupon in the main tubing to form a hole in the main tubing and retaining the coupon within and blocking said coupling cutter open end, said coupling cutter permitting fluid flow through said at least one flow opening and through said passageway, said sealing surface engaging an exterior portion of said main tubing after said coupon has been retained and said at least one flow opening have been received within said main tubing so that said coupling cutter connects said branch tubing to the main tubing.

2. A branch connector of claim 1 wherein said coupling cutter has further sealing means for preventing leakage of fluid between the main tubing and said coupling cutter when said coupling cutter is located in the main tubing.

3. A branch connector of claim 1 wherein said open end cutting portion comprises a portion of a cutting tool, said cutting tool having an inside diameter and an outside diameter with a cutting edge located on said inside diameter of said cutting tool so that the hole formed in the main tubing forms an interference fit with the outside diameter of said cutting tool when said cutting tool is located therein to thereby provide a leakproof junction between said cutting tool and the main tubing.

4. A branch connector of claim 1 wherein said coupling cutter has flat circular ridges for flattening and engaging the main tubing to provide a fluid barrier to prevent leakage of fluid from the main tubing.

5. The branch connector of claim 1 wherein said coupling cutter includes a cylindrical tapered blade for holding the material cutout from the main tubing as a user rotates said coupling cutter into the main tubing.

6. The branch connector of claim 1 wherein said coupling cutter has a sealing region for preventing fluid from flowing between said coupling cutter and the main tubing.

7. The branch connector of claim 1 wherein said coupling cutter has a port region for directing fluid from the main tubing into said coupling cutter.

8. The branch connector of claim 1 wherein said coupling cutter has a cylindrical tapered cutting blade for cutting a hole in the main tubing.

9. The branch connector of claim 1 wherein said mating members are identical to each other.

10. The branch connector of claim 1 wherein said first latching means includes a resilient male latch to snap into engagement with a female latch on said first member to thereby lockingly hold said first mating member in engagement with said second mating member.

11. A branch connector of claim 1 wherein said mating members includes gripping surfaces for prevention of lateral displacement of the main tubing located in said pipe saddle clamp.

12. A branch connector of claim 1 wherein said coupling cutter has threads for engaging said first and second mating members.

13. A branch connector of claim 1 wherein said top portions of said first and second mating members have internal double threaded surfaces with said internal double threaded surface recessed from the top portion of said first and second mating members to thereby provide a guide for inserting the coupling cutter into threaded engagement with the double threaded surface.

14. A branch connector of claim 1 wherein said coupling cutter contains two sets of threads for attachment of a branch pipe thereto.

15. The branch connector of claim 1 wherein said coupling cutter, said first and said second mating members are made of hardened plastic material and said second latching means includes that faces away from the top portion of said second mating member so that expansion of a pipe located in said bottom portion of said first and second mating members causes said male latch member to form tighter engagement with a female latching member located on said first mating member.

16. The branch connector of claim 1 including an arcuate insert for mounting in said lower region of said bottom portion to reduce the diameter of the opening in the lower region to permit the branch connector to sealingly engage a second main tubing that is smaller than the first main tubing.

17. The branch connector of claim 1 wherein said coupling cutter has an end region for holding and storing the coupon cut out from the main tubing.

18. The branch connector of claim 1 wherein said branch connector has a one-way latch stop to prevent loosening of the coupling cutter from the branch connector.

19. The branch connector of claim 1 wherein said coupling cutter comprises a seamed cutting tool for holding and storing the coupon cut out from the main tubing.

20. The branch connector of claim 1 wherein said coupling cutter includes means for holding said first mating member and said second mating member proximate to one another to permit placing a partially assembled branch connector around a main tubing.

21. The method of attaching a branch pipe to a main tubing comprising the following steps:
placing a first mating member and a second mating member having identical self mating latching mechanisms around a main tubing;
forcing said first mating member toward said second mating member together until said first mating member and said second mating member latch together to form a top region for threadingly receiving a coupling and a bottom portion for engaging the main tubing;
inserting a coupling cutter into the region for threadingly receiving a coupling in said top portions created by said first mating member and said second mating members, said coupling cutter having a through passageway therein with an open end cutting portion at one end of said passageway, a sealing surface being disposed on an outer surface of said coupling cutter and at least one flow opening being positioned proximate said open end cutting portion;
rotating said coupling cutter to cut out a coupon in the main tubing to form a hole in the main tubing; and
retaining the coupon within and blocking said coupling cutter open end, while said coupling cutter permits fluid flow through said at least one flow opening and through said passageway while said sealing surface engages an exterior portion of said main tubing after said coupon has been retained and said at least one flow opening have been received within said main tubing to thereby provide a branch connection to the main tubing while retaining a cut out portion of the main tubing in the coupling cutter.

22. The method of claim 21 including the step of holding said first mating member and said second mating member in pivoting relationship before placing said first mating member and said second mating member around the main tubing.

23. The method of claim 22 including the step of partially flattening the main tubing with the coupling cutter to thereby engage sealing ridges on the coupling cutter so that the sealing ridges form a secondary seal.

24. The method of claim 22 including the step of rotating the coupling cutter into a threaded recess formed between the first mating member and said second mating member.

25. The method of claim 22 including the step of retaining and storing the material cut from the main tubing in the cutting tool during use of the branch connector to divert a fluid from the main tubing.

26. The method of claim 21 including the step of storing the coupon cut from the main tubing in the coupling cutter.

27. A branch connector for forming a branch line to a main tubing comprising;
a first mating member, said first mating member having a top portion for coupling to a branch tubing and a first bottom portion for engaging a main tubing, said first bottom portion having first latching means, said top portion having a first threaded portion for receiving a coupling, said bottom portion having a region which fastens around the main tubing;
a second mating member, said second mating member having a top portion for coupling to a branch tubing and a bottom portion for engagin the main tubing, said top portion of said second mating member having a second threaded portion for receiving a coupling, said first threaded portion and said second threaded portion having identical portions that when mated together form a threaded recess for receiving a coupling, said bottom portion of said second mating member having second latching means, said first latching means and said second latching means having identical portions for latching said bottom portion of said first mating member to said bottom portion of said second mating member, to thereby form a pipe saddle clamp around the main tubing; and
a coupling cutter for forming a hole in the main tubing and for sealing the junction between the main tubing and said coupling cutter to prevent leakage of fluid, said coupling cutter having a through passageway therein with an open end cutting portion at one end of said passageway, a sealing surface being disposed on an outer surface of said coupling cutter and at least one flow opening being positioned proximate said open end cutting portion, said coupling cutter rotatable threaded for cutting out a coupon in the main tubing to form a hole in the main tubing and retaining the coupon within and blocking said coupling cutter open end, said coupling cutter permitting fluid flow through said at least one flow opening and through said passageway, said sealing surface engaging said main tubing after said coupon has been retained and said at least one flow opening have been received within said main tubing so that said coupling cutter connects said branch tubing to the main tubing.

28. A branch attachment for forming a hole in a main tubing and for sealing the junction between the main tubing and a coupling cutter to prevent leakage of fluid comprising:

means for holding a main tubing in a position to form a branch line, said means including two members with identical parts for snapping said means around a main tubing;

a coupling cutter, having through passageway therein with an open end cutting portion at one end of said passageway, a sealing surface being disposed on an outer surface of said coupling cutter and at least one flow opening being positioned proximate said open end cutting portion, said coupling cutter rotatable threaded for cutting out a coupon in the main tubing to form a hole in the main tubing and retaining the coupon within and blocking said coupling cutter open end, said coupling cutter permitting fluid flow through said at least one flow opening and through said passageway, said sealing surface engaging an exterior portion of said main tubing after said coupon has been retained and said at least one flow opening have been received within said main tubing; and sealing means connected to said coupling cutter for preventing leakage of fluid from the main tubing to permit said coupling cutter to connect said branch line to the main tubing.

29. The branch connector of claim 27 wherein said coupling cutter includes an integral drain valve to permit a user to fasten a drain valve to the main pipe during the attachment of the branch connector.

30. The branch connector of claim 27 wherein said coupling cutter includes a cutting tool with at least one cutting tooth and said means for holding a main tubing in a position to form a branch line includes a male latch member has a lip that faces away from said means for holding a main tubing so that radial expansion of a tubing located in said said means for holding a main tubing causes said male latch member to form tighter engagement with a female latching member located on said means for holding a main tubing to prevent said male member on said means for holding a main tubing from disengaging from said female member on said means for holding a main tubing.

31. The branch connector of claim 27 wherein said coupling cutter includes a cylindrical confinement housing to hold said top portion of said self mating members proximate one another.

* * * * *